United States Patent [19]

Tankersley

[11] Patent Number: 5,630,577
[45] Date of Patent: May 20, 1997

[54] CLAMP ASSEMBLY

[76] Inventor: James E. Tankersley, Laser-Tronics, 1413 Linda Vista Dr., San Marcos, Calif. 92069

[21] Appl. No.: 495,207

[22] Filed: Jun. 27, 1995

Related U.S. Application Data

[63] Continuation-in-part of Ser. No. 358,187, Dec. 16, 1994, Pat. No. 5,516,086.

[51] Int. Cl.$^6$ ........................................................ B23Q 3/00
[52] U.S. Cl. ........................ 269/309; 29/411; 269/48.1; 411/55
[58] Field of Search .................... 269/47, 48.1, 48.2, 269/48.3, 71, 91, 99, 100, 95, 97, 138, 309, 311, 312, 900; 29/464, 559; 411/55, 60, 61, 321, 322, 323, 948

[56] References Cited

U.S. PATENT DOCUMENTS

| | | | |
|---|---|---|---|
| 1,017,371 | 2/1912 | Beck | 411/321 |
| 1,814,858 | 7/1931 | Rutter | 411/948 |
| 1,847,937 | 3/1932 | Fetters | 411/55 |
| 2,560,413 | 7/1951 | Carlson | 29/464 |
| 2,732,868 | 1/1956 | Barta | 269/97 |
| 2,787,185 | 4/1957 | Rea et al. | 411/55 |
| 2,868,339 | 1/1959 | Lazarowicz | 29/464 |
| 4,789,282 | 12/1988 | Abraham | 411/55 |
| 5,074,536 | 12/1991 | McConkey | 269/48.1 |

FOREIGN PATENT DOCUMENTS

| | | | |
|---|---|---|---|
| 323319 | 7/1920 | Germany | 411/321 |
| 1475108 | 4/1969 | Germany | 411/55 |
| 58019 | 4/1920 | Sweden | 411/55 |
| 388131 | 2/1933 | United Kingdom | 411/61 |

*Primary Examiner*—Robert C. Watson
*Assistant Examiner*—Thomas W. Lynch
*Attorney, Agent, or Firm*—Loyal M. Hanson

[57] ABSTRACT

A clamp assembly for clamping first and second objects together includes a sleeve adapted to fit within a first bore in the first object, the sleeve having a first end, a second end, and a slit extending from the first end to the second end. Bolt-driven sleeve-expansion components operate to radially expand the sleeve within the first bore of the first object while applying force to the sleeve axially toward the second object. One embodiment includes a cylindrically shaped, longitudinally split sleeve of resiliently deformable composition. A conically shaped member and a bolt having a conically shaped head and a shank adapted to screw into the second bore cooperate as sleeve expansion components. The tapered head of the bolt faces a first tapered inner surface of the sleeve, and a tapered exterior surface on the conically shaped member faces a second tapered inner surface of the sleeve. The shank of the bolt extends axially through the sleeve and the conically shaped member. Screwing the end portion of the shank sufficiently into the second bore in the second object causes the tapered exterior surface of the conically shaped head of the bolt and the tapered exterior surface of the conically shaped member to cooperatively bear against respective ones of the first and second tapered inner surfaces of the sleeve so that the sleeve expands and bears against the first object radially as well as axially toward the second object. Unscrewing the bolt a partial turn unlocks the clamp.

10 Claims, 4 Drawing Sheets

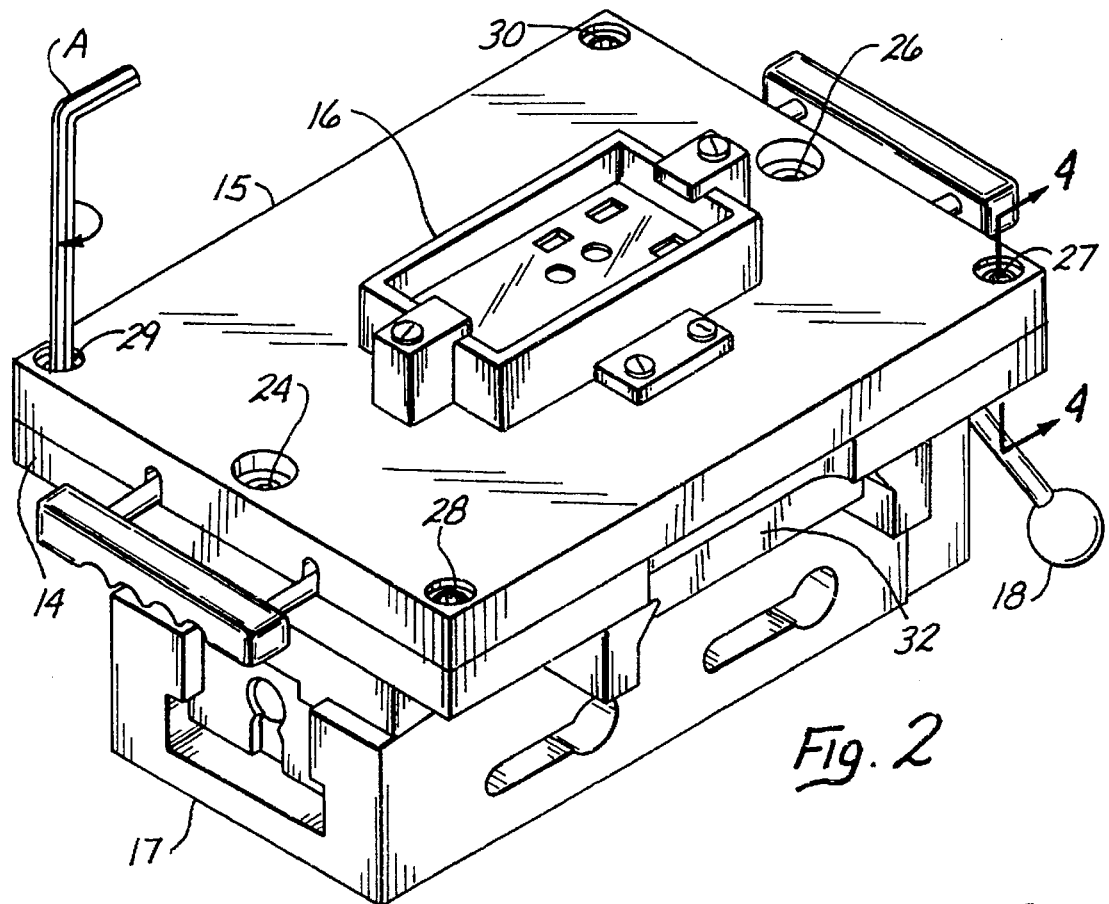
Fig. 2
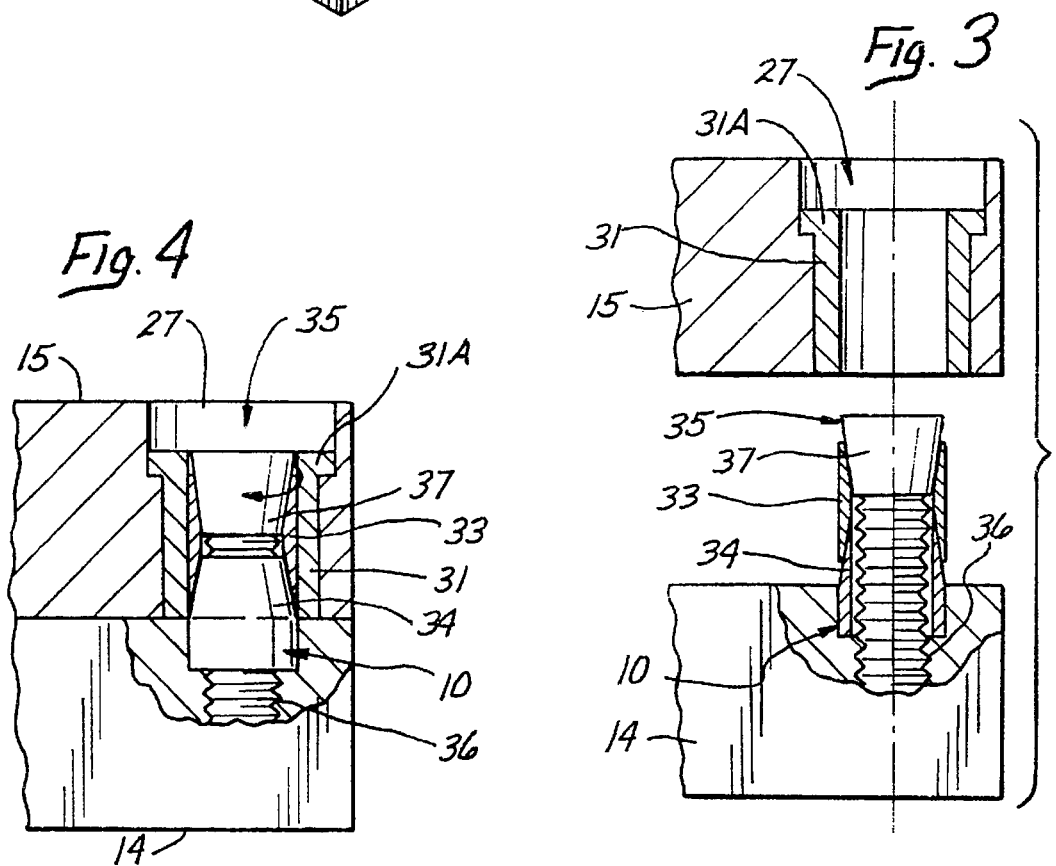
Fig. 3
Fig. 4

CLAMP ASSEMBLY

CROSS-REFERENCE TO RELATED APPLICATIONS

This application is a continuation in part of Ser. No. 08/358,187, now U.S. Pat. No. 5,516,086, filed Dec. 16, 1994.

BACKGROUND OF THE INVENTION

1. Technical Field

This invention relates generally to clamps, and more particularly to an inexpensive clamp assembly with quick locking and release action that provides both positional accuracy and high repeatability while being easily installed.

2. Description of Related Art

Recall that some clamping applications seek quick locking and release action while demanding strength and precision. Consider the task of holding a workpiece during machining by a computerized machining center, for example. The machinist uses workpiece holding components to clamp each workpiece securely on the machining center worktable while he drills or otherwise machines it. Then he removes the workpiece and mounts another. Thus, the workpiece holding components should lock and release quickly and securely while maintaining both positional accuracy and high repeatability.

But some existing workpiece holding components have certain drawbacks. Visualize, for example, an existing pallet system for a vertical machining center. It may include a receiver plate that mounts on the worktable and several interchangeable pallets that hold the workpieces. With a vise securely holding the receiver plate on the worktable, the machinist selects one of the pallets, mounts it on the receiver plate, and then machines the one or more workpieces it holds. After that, he removes the pallet from the receiver plate and mounts another one.

He continues that way to machine all the workpieces, and so the manner in which the pallet mounts on the receiver plate is critical. However, some existing pallet systems do so with four bolts that pass through the pallet into threaded holes in the receiver plate. That means the bolts must be screwed all the way in and all the way out each time the pallet is changed, and that procedure can be too time consuming. Furthermore, bolts fit loosely through the pallet and so indexing pins or other suitable means must be used to properly position the pallet on the receiver plate. That increases cost and complexity. Thus, machinists need a better way to mount the pallet on the receiver plate.

Many other applications experience the same problem. So they need a better way also—an inexpensive clamp assembly with quick locking and release action that provides both positional accuracy and high repeatability while being easily installed.

SUMMARY OF THE INVENTION

This invention solves the problem outlined above by providing a clamp assembly that locks and unlocks with a partial turn of a bolt. The bolt has a conically shaped head and a shank that extends through both an expandable sleeve and an opposing conically shaped member. With the sleeve disposed within a bore in the pallet and the bolt threaded into a threaded hole in the receiver plate, a partial turn of the bolt causes the conically shaped head of the bolt and the opposing conically shaped member to bear against and expand the sleeve. That, in turn, causes the sleeve to bear against the pallet radially as well as axially toward the receiver plate, with strong positive clamping action. A partial turn in the reverse direction releases it.

Thus, the clamp assembly of this invention provides quick locking and release action. It has just a few, relatively inexpensive components. It is easily installed. The sleeve expands radially to provide positional accuracy and repeatability. The sleeve also bears axially to securely clamp two components together. So, the clamp assembly may be called a "pull down clamp," and its attributes suit any of various bolting and clamping applications.

To paraphrase some of the claim language subsequently presented, a clamp assembly constructed according to the invention for clamping first and second objects together includes a sleeve adapted to fit within a first bore in the first object. The sleeve has a first end, a second end, and a slit extending from the first end to the second end. Bolt-driven, sleeve-expansion components operate to radially expand the sleeve within the first bore of the first object while applying force to the sleeve axially toward the second object.

Summarizing one embodiment of the invention another way in more detail, the invention provides a clamp assembly for clamping a first object to an abutting second object. The first object has a first bore of known diameter extending through it. The second object has a threaded second bore axially aligned with the first bore.

The clamp assembly includes a cylindrically shaped sleeve composed of a resiliently deformable material that fits within the first bore in the first object. The sleeve has a first end, a second end, a slit extending longitudinally from the first end to the second end, a first tapered inner surface that extends axially from the first end while decreasing in inside diameter, a second tapered inner surface that extends axially from the second end while decreasing in diameter, and a uniform outside diameter smaller than the diameter of the first bore.

As an idea of size and construction, a sleeve constructed according to the invention for a ½-inch diameter bore in the first object measures about 0.490 inch in outside diameter and 0.500 inch in length. The first and second tapered inner surfaces taper at about 9 degrees from a larger inside diameter at the first and second ends of the sleeve of about 0.470 inch to a smaller inside diameter of 0.370 inch intermediate the two ends. In addition, the sleeve is fabricated from 4130 steel and coated with a non-stick coating such as that available under the trademark TEFLON ENT.

The clamp assembly also includes expansion components for radially expanding the split sleeve within the first bore of the first object. The expansion components do so while applying force to the sleeve axially toward the second object. Those two components of force cause the sleeve to bear against an interior surface of the first bore in the first object, both radially and axially toward the second object.

The expansion components include both a conically shaped member with a bore through it and a bolt having a conically shaped head and a shank adapted to pass through the sleeve and conically shaped member and screw into the second bore in the second object. The conically shaped head of the bolt includes a tapered exterior surface facing the first tapered interior surface of the sleeve. The conically shaped member also has a tapered exterior surface that faces the second tapered inner surface of the sleeve.

As a further idea of size and construction, one embodiment of a conically shaped member constructed according to the invention (for use with the 0.490 inch diameter sleeve described above) has an outside diameter of about 0.501 inch over a 0.200 inch long portion of the member, and then it tapers at about 9 degrees to about 0.400 inch for a total length of about 0.525 inch. In addition, it has a bore diameter of about 0.380 inch and it is fabricated from 4130 steel with a non-stick coating like the sleeve. The companion bolt is machined from an existing ⅜-16 alloy steel cap screw so that the head has a diameter slightly less than the 0.500 inch first bore diameter, and so that the head tapers at about 9 degrees.

The shank of the bolt extends from the conically shaped head, axially through the sleeve, and then axially through the bore in the conically shaped member to a threaded end portion of the shank in a position beyond the conically shaped member enabling the shank to be screwed into the second bore in the second object. Screwing the shank of the bolt sufficiently into the second bore in the second object, with the sleeve disposed within the first bore in the first object, causes the tapered exterior surface of the conically shaped head of the bolt and the tapered exterior surface of the conically shaped member to cooperatively bear against respective ones of the first and second tapered inner surfaces of the sleeve. That in turn causes the diameter of the sleeve to increase so that the sleeve to bears against the first object radially as well as axially toward the second object.

Thus, the clamp assembly of this invention overcomes many inefficiencies of existing clamps for quick-change pallet systems as well as for any of various other bolting and clamping applications. The following illustrative drawings and detailed description make the foregoing and other objects, features, and advantages of the invention more apparent.

BRIEF DESCRIPTION OF THE DRAWINGS

FIG. 2 is a three-dimensional view similar to FIG. 1 that illustrates operation of one of the pull down clamps with the pallet in position on the receiver plate;

FIG. 3 is an enlarged view of a portion of the pallet system with portions in cross section on line 3—3 of FIG. 1, showing one of the pull down clamps in an unlocked position;

FIG. 4 is an enlarged view with portions in cross section on line 4—4 of FIG. 2, showing the pull down clamp in a locked position;

DESCRIPTION OF THE PREFERRED EMBODIMENTS

Figure 1:
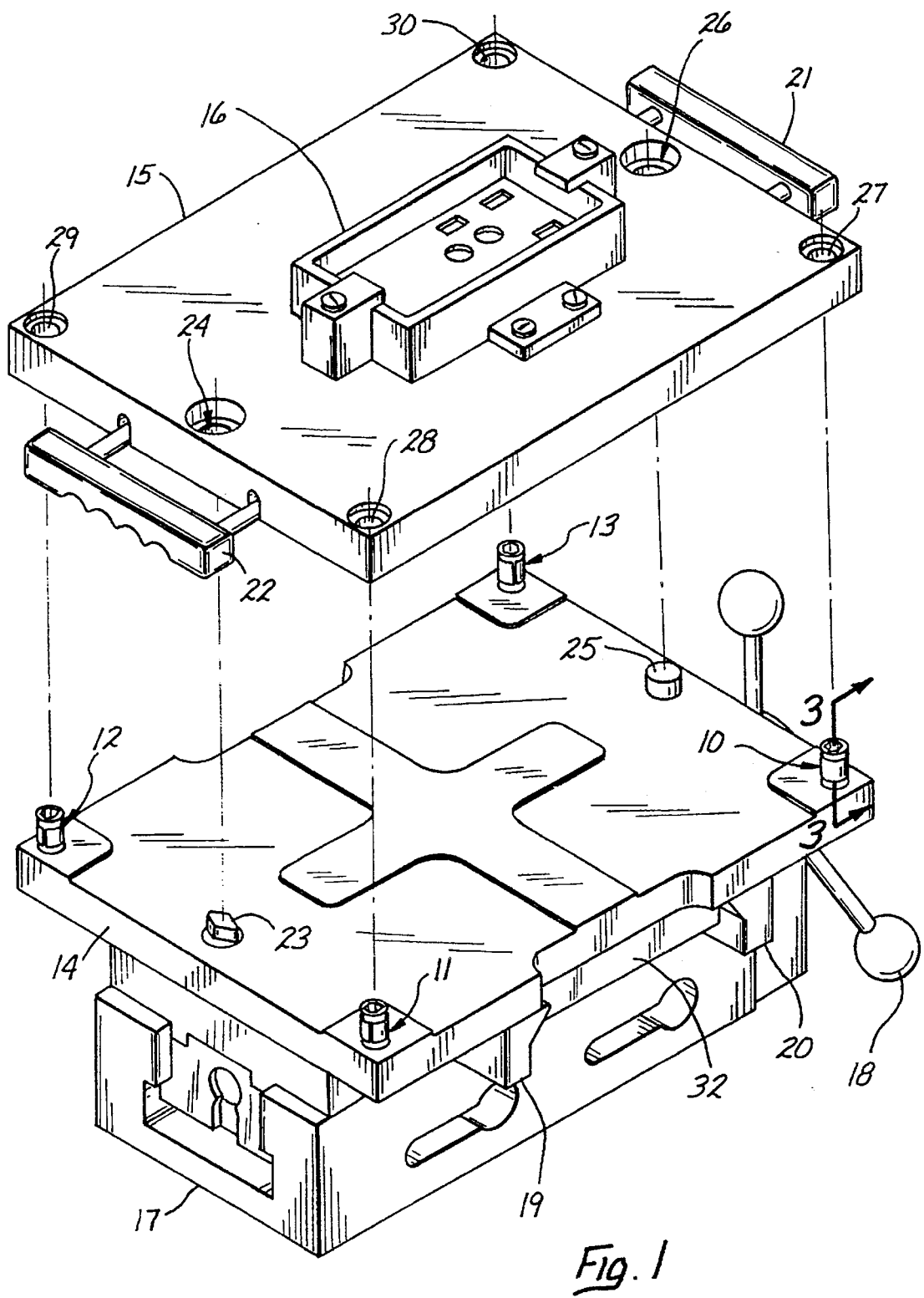
FIG. 1 of the drawings is a three-dimensional view of four pull down clamp assemblies constructed according to the invention installed on the receiver plate of a quick-change pallet system, with the pallet in position for installation on the receiver plate.

FIG. 1 of the drawings shows four clamp assemblies constructed according to the invention that are designated clamps 10 through 13. They are installed on a receiver assembly or receiver plate 14 for locking a pallet 15 (one of several interchangeable pallets) in position on the receiver plate 14. The receiver plate 14 and pallet 15 are components of a quick-change pallet system used to hold a workpiece 16 on the worktable of a computerized machining center, and the four clamps 10–13 enable the machinist to quickly remove one pallet and install another for purposes of changing workpieces.

Of course, a clamp assembly constructed according to the invention may be used in any of various other clamping applications without departing from the broader inventive concepts disclosed. The quick-change pallet system illustrates just one important application that enables efficient setup and job-change procedures for far less machining center down time. In terms of some of the claim language, the pallet 15 may be thought of as a first object, the receiver plate 14 as a second object, and each of the clamps 10–13 as a clamp assembly for clamping the first object to the second object in an abutting relationship as shown in FIG. 2 such that the first object lies flat against the second object.

The machinist operates the machining center to machine the workpiece. The machining center may take any of various known forms, including a machining center with a vertical spindle that drills holes vertically under computer control. Machining centers are well known to machinists and others familiar with machining, and so a machining center and its worktable (e.g., a metal support with a horizontal work surface) are not illustrated in the drawings.

The machinist mounts a known type of sturdy vise 17 (FIG. 1) on the worktable of the computerized machining center with bolts or other suitable means (not shown). Next, by operating a star handle or vise handle 18 of the vise 17, he moves the dovetail vise jaws 19 and 20 together in order to securely hold the receiver plate 14 with the vise 17 in a fixed position atop the worktable. After that, and with the workpiece 16 mounted on the pallet 15 by clamps or other suitable means, he grasps the handles 21 and 22 on the pallet 15 and positions the pallet 15 above the receiver plate 14 as shown in FIG. 1, so that a diamond-shaped alignment pin 23 aligns with a hole or bore 24 in the pallet 15 and a cylindrically shaped alignment pin 25 aligns with a hole or bore 26 in the pallet 15. So aligned, the clamps 10–13 align with respective ones of holes or bores 27 through 30 in the pallet 15.

The machinist then lowers the pallet 15 onto the receiver plate 14, to a position as shown in FIG. 2 in which the alignment pins 23 and 25 and the clamps 10–13 occupy positions within respective ones of the bores 24 and 26 and the bores 27–30. The pallet 15 and receiver plate 14 abut, and the machinist tightens each of the clamps 10–13 with a partial clockwise turn of each of the clamps 10–13 using an allen wrench A (as depicted by arrows in FIGS. 2 and 4). In that way, he causes each of the clamps 10–13 to bear radially against a respective one of four bushings within the bores 27–30, as well as axially toward the receiver plate 14. Locking each of the clamps 10–13 that way holds the pallet 15 securely with positional accuracy and repeatability despite quick-change operations. Of course, bushings are not required within the broader inventive concepts disclosed, but the illustrated pallet system includes bushings (referred to as headliner bushings) that install in holes in the pallet 15 as part of the pallet to provide hard linings that define the bores 27–30. One of the bushings (a bushing 31 that defines the bore 27) is subsequently described in further detail with reference to FIGS. 3, 4, and 8.

With the pallet 15 mounted on the receiver plate 14 and the machining center machining the workpiece 16, the user may setup another job on a different pallet (not shown) for quick interchange. To interchange jobs, he removes the pallet 15 by first loosening (i.e., unlocking) each of the clamps 10–13 with a partial counterclockwise turn of the allen wrench A. Next, he grasps the handles 21 and 22 and lifts the pallet 15 from the receiver plate 14. The handles 21 and 22 are pivotally mounted on the pallet 15 as subsequently described with reference to FIG. 6 so that lifting them helps disengage the pallet 15 from the alignment pins 23 and 25.

Once the machinist has removed the pallet 15, he sets it aside and mounts a different pallet on the receiver plate 14 in the manner described above for the pallet 15—quickly and conveniently with a partial turn of each of the clamps 10–13. Thus, the clamp assembly of this invention enables quick-change pallet system operation that in turn facilitates efficient machining operations.

As an idea of size and construction of the various components described above, consider the entire quick-change pallet system. The receiver plate 14 and the pallet 15 are both aluminum components that measure about 10 inches wide by 13.5 inches long by one-inch thick. The receiver plate 14 includes a 5.5-inch wide by 9-inch long by one-inch thick aluminum plate 32 bolted to the underside of the receiver plate 14 for the dovetail vise jaws 19 and 20 to grip. The cylindrical alignment pin 25 measures 0.75" in diameter, the diamond-shaped pin 23 is similarly sized, and each of the bores 27–30 is 0.500 inch in diameter, each bore being defined by a bushing (such as the bushing 31 in FIGS. 3 and 4) that is set within a respective one of four counterbored 0.75-inch diameter holes in the receiver plate 14. Of course, those dimensions may vary significantly without departing from the inventive concepts disclosed.

The clamps 10–13 are alike and so only the clamp 10 is described in further detail. It includes a cylindrically shaped sleeve 33 (i.e., a tube with a cylindrically shaped outer surface), a conically shaped member 34 (sometimes referred to as a press-fit cone), and a bolt 35 with a threaded shank 36 and a conically shaped head 37 that is sometimes referred to as a custom socket-head bolt (FIGS. 3–5 and FIG. 8). The preferred embodiment illustrated also includes the bushing 31 visible in FIGS. 3, 4 and 8 (i.e., a headliner bushing). Those components cooperate to clamp a first object (i.e., the pallet 15) to an abutting second object (i.e., the receiver plate 14).

Figure 8:
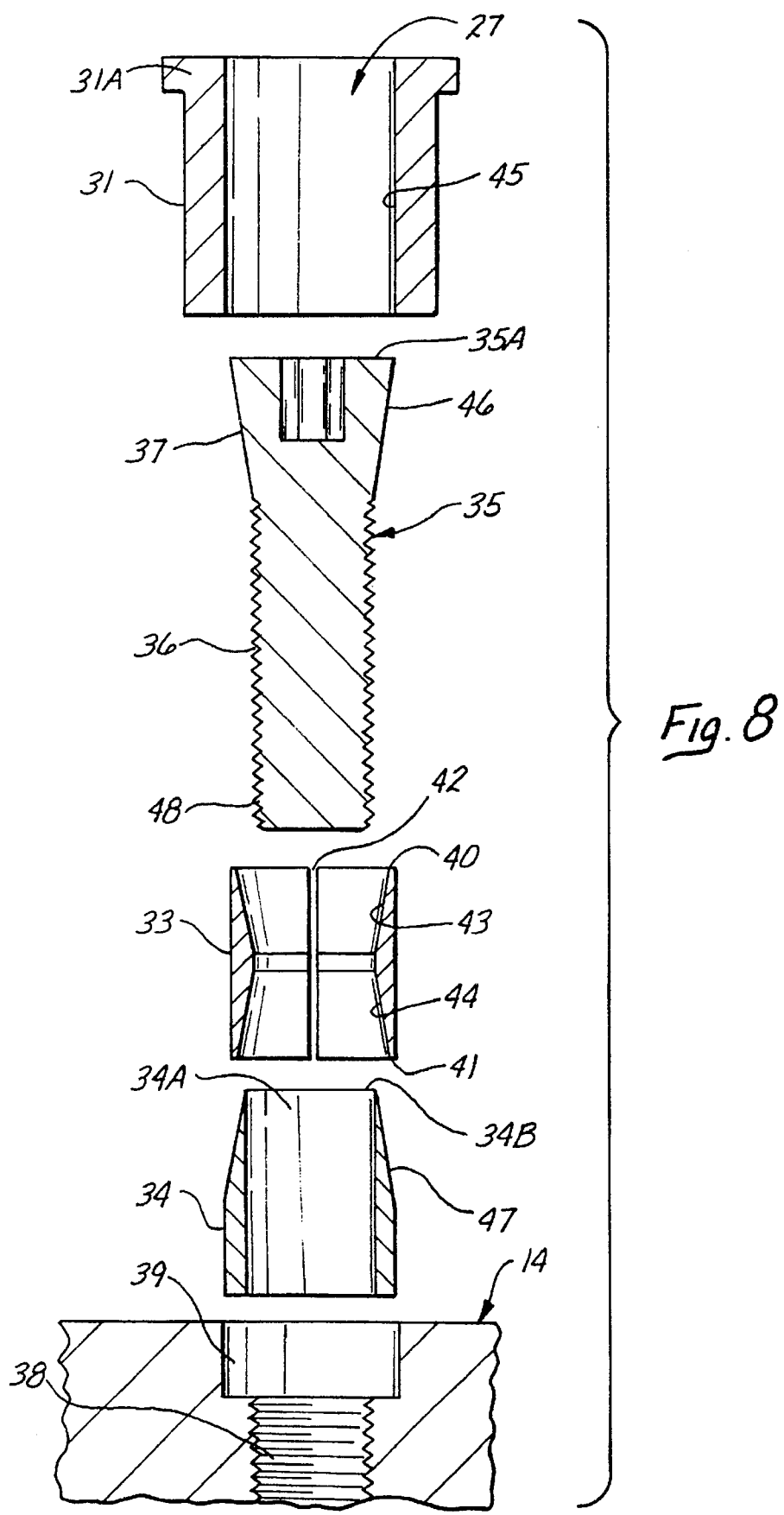
FIG. 8 is an enlarged exploded view in cross section, showing a pull down clamp and a companion bushing.

The pallet 15 has a first bore of known diameter extending through it (i.e., the 0.500 inch diameter bore 27 defined by the bushing 31 shown in FIGS. 3, 4, and 8). The receiver plate 14 has a threaded second bore 38 in it that is axially aligned with the first bore 27 as shown in FIG. 8 (e.g., a ⅜-16 thread). To install the clamp 10 in the receiver plate 14, the 0.501-inch larger diameter of the conically shaped member 34 is set with a press fit in a 0.500-inch diameter counterbored portion 39 of the ⅜-16 threaded second bore 38, to the position shown in FIGS. 3–5 (the 0.500 inch diameter by 0.200-inch deep counterbored portion 39 is visible in FIG. 8). Next, the bolt 35 is placed through the sleeve 33 and the conically shaped member 34. Then the bolt is screwed partially into the threaded second bore 38, until the sleeve 33 rests lightly against the conically shaped member 34 and the bolt 35 bears lightly against the sleeve 33 (i.e., without expanding the sleeve) as shown in FIG. 3.

Figure 5:
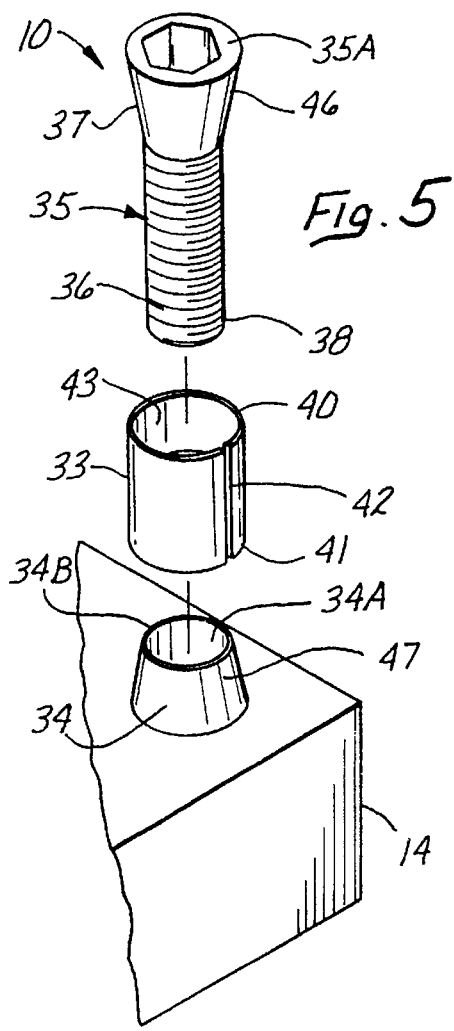
FIG. 5 is an exploded three-dimensional view showing the pull down clamp disassembled.

The cylindrically shaped sleeve 33 is composed of a resiliently deformable material (e.g., a 0.500-inch long component of 4130 steel coated with a TEFLON ENT non-stick coating). The sleeve 33 has a first end 40, a second end 41, and a slit 42 extending longitudinally from the first end 40 to the second end 41 (FIGS. 5 and 8). The slit 42 allows the sleeve 33 to expand within the bore 27 as subsequently described. The sleeve 33 deforms when the conically shaped head 37 of the bolt 35 (also referred to herein as a first conically shaped structure) and the conically shaped member 34 (also referred to herein as a second conically shaped structure) bear against it. With the sleeve 33 deforming that way, the exterior of the sleeve 33 bearing against the bushing 31 in what may be described as full circumferential contact, and that results in significant frictional force between the sleeve and the bushing (similar in some respects to the action of a drum brake on an automobile). When the bolt 35 is loosened, the sleeve 33 returns to its original unexpanded shape.

A first tapered inner surface 43 extends axially within the sleeve 33 at a 9-degree taper from a 0.470-inch inside diameter at the first end 40 to a 0.370-inch inside diameter intermediate the first and second ends (FIG. 8). Similarly, a second tapered inner surface 44 extends axially at a 9-degree taper from a 0.470-inch inside diameter at the second end 41 to a 0.370-inch inside diameter intermediate the first and second ends (FIG. 8). The exterior of the sleeve 33 has a 0.490-inch uniform outside diameter, just slightly smaller than the 0.500-inch inside diameter of the first bore.

The bolt 35 and the conically shaped member 34 (with a bore 34A through it) cooperate as expansion means for radially expanding the sleeve 33 within the first bore 27 of the pallet 15. They do so while applying force to the sleeve 33 axially toward the receiver plate 14, and that causes the sleeve 33 to bear against an interior surface 45 of the bore 27 (i.e., an interior surface of the bushing 31 shown in FIG. 8) both radially and axially toward the receiver plate 14 (an enlarge head or flange portion 31A of the bushing 31 bears towards the receiver plate 14 against the pallet 15 within the counterbored hole in the pallet 15.

The conically shaped head 37 of the bolt 35 includes a tapered exterior surface 46 (FIGS. 5 and 8) that extends at a 9-degree taper from a 0.480-inch diameter at a first end 35A of the bolt 35 toward the ⅜-16 threaded shank 36. The tapered exterior surface 46 is also referred to herein as a first conically shaped surface, and it faces the first tapered interior surface 43 of the sleeve 33. The surface 46 bears against the surface 43 to expand the sleeve 33. The 0.480-inch diameter of the head 37 allows the bushing 31 defining 0.500-inch bore 27 to pass over the head 37 during installation and removal of the pallet 15.

The conically shaped member 34 has a tapered exterior surface 47 (FIGS. 5 and 8) that extends at a 9-degree taper from a 0.501-inch diameter to a 0.400-inch diameter at a first end 34B of the conically shaped member 34. The tapered exterior surface 47 is also referred to herein as a second conically shaped surface, and it faces the second tapered inner surface 44 of the sleeve 33. In operation, it bears against the surface 47 to expand the sleeve in cooperation with the head of the bolt. The 9 degree taper employed throughout works well in expanding the sleeve 33 with just a partial turn of the bolt. Increasing the taper from 9 degrees results in less axially movement of the bolt (less turning of the bolt) being necessary to expand the sleeve 33 sufficiently to lock the clamp. Decreasing the taper results in more turning being required.

In terms of some of the claim language, the shank 36 of the bolt 35 extends from the conically shaped head 37 of the bolt 35, axially through the sleeve 33, and then axially through the bore 34A in the conically shaped member 34 to a threaded end portion 48 of the shank 36 (FIG. 8). The end portion 48 is in a position beyond the conically shaped member 34 enabling it to be screwed into the second bore 38 in the receiver plate 14. Screwing the shank 36 of the bolt 35 sufficiently into the second bore 38, with the sleeve 33 disposed within the first bore 27 in the pallet 15 (i.e., in the bushing 31), causes the tapered exterior surface 46 of the head 37 of the bolt 35 and the tapered exterior surface 47 of the conically shaped member 34 to cooperatively bear against respective ones of the first and second tapered inner surfaces 43 and 44 of the sleeve 33. Doing so causes the diameter of the sleeve 33 to increase (the sleeve expands) so that the sleeve 33 bears against the interior surface 45 of the bore 27 in the pallet 15 both radially and axially toward the receiver plate 14.

Figure 6:
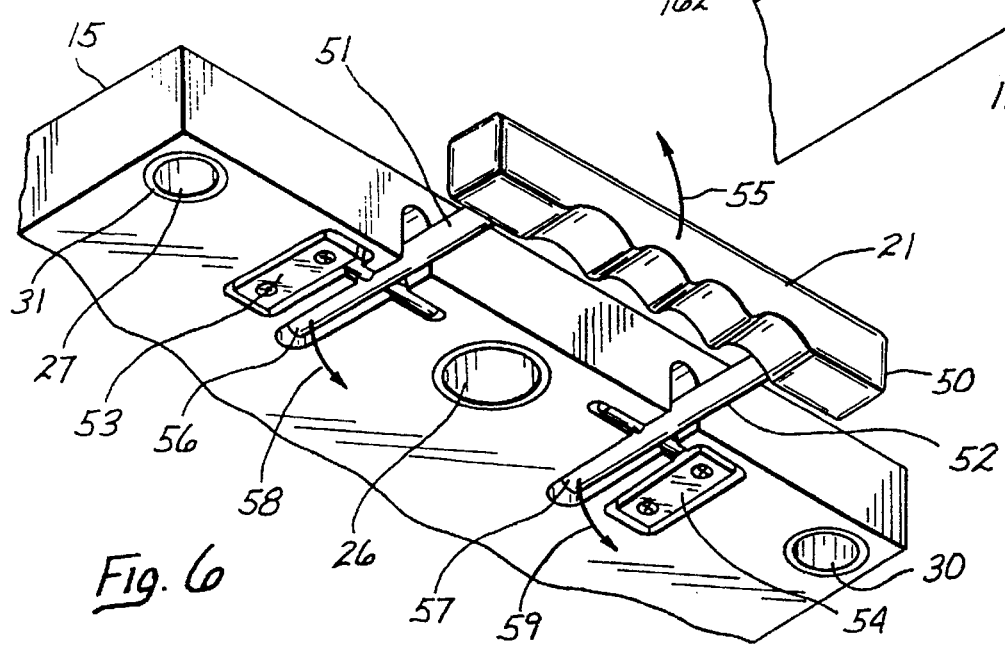
FIG. 6 is an enlarged view of the underside of the pallet showing how operation of the handle disengages the alignment pins.

Now consider FIG. 6. It shows the underside of the pallet 15 to illustrate operation of the handle 21 and the manner in which it helps to disengage the conically shaped member 34 from the sleeve 33 as well as lift the pallet 15 from the alignment pins 23 and 25. A grip or member 50 of the handle 21 is supported by first and second arms 51 and 52. The first arm 51 is pivotally mounted by a first mounting 53 or other suitable means. Similarly, the second arm 52 is pivotally mounted by a second mounting 54 or other suitable means. As a result, lifting on the member 50 causes in the direction of an arrow 55 in FIG. 6, causes distal ends 56 and 57 of the arms 51 and 52 to pivot in the direction of arrows 58 and 59.

Pivoting in that way, the arms 51 and 52 help pry the pallet 15 from the receiver plate 14 and disengage the conically shaped member 34 from frictional engagement of the sleeve 33. The press fit of the conically shaped member 34 in the counterbored portion 39 (FIG. 8) serves a similar function. It helps hold the conically shaped member 34 on the receiver plate 14 as the pallet 15 is removed.

Figure 7:
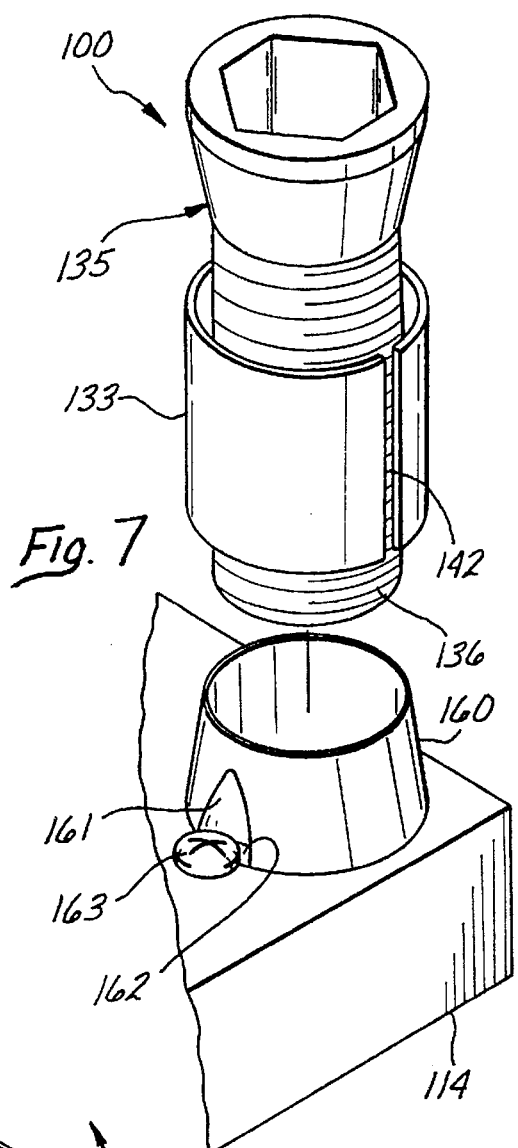
FIG. 7 is an three-dimensional view similar to FIG. 5 that illustrates the cone-holding details that may be used with a larger pull down clamp assembly.

FIG. 7 illustrates another embodiment of a clamp constructed according to the invention. Designated as clamp 100, it is similar in many respects to the clamp 10 and so only differences are described in further detail. For convenience, reference numerals designating parts of the clamp 100 are increased by one hundred over those designating similar parts of the clamp 10.

Other than larger size, the major difference in the clamp 100 resides in the construction of the conically shaped member 160. Unlike the conically shaped member 34 of the clamp 10, the conically shaped member 160 includes a recessed portion 161 that forms a lip 162. It rests directly on the receiver plate 114, instead of in a counterbored hole. A screw 163 screwed into a threaded hole in the second object 114 bears downwardly against the lip 162 (toward the receiver plate 114) to hold the member 160 on the receiver plate 114 during removal of the first object clamped to the second object. The sleeve 133 of the clamp 100 has a 1-inch outside diameter, and that results in greater friction engagement of the sleeve 133 by the conically shaped member 160—sufficiently large to overcome a press fit as used for the conically shaped member 34.

A tensile test of the clamp assembly 10 showed impressive clamping. The test was performed with a 120,000 pound tensile testing machine available from Baldwin on two elongated bars of aluminum that were clamp together end-to-end with a clamp assembly similar to the clamp assemblies 10–13 (i.e., the test clamp), but without a bushing (a headliner bushing). Each bar had a 2-inch by 2-inch square cross section in a plane perpendicular to its axis of elongation and the two bars were clamped together with their axes of elongation aligned and one end of the first bar abutting a first end of the second bar.

To clamp the two pieces together, a 0.5-inch first hole was drilled longitudinally through the first or upper bar, fully along its axis of elongation in order to allow access to the head of the bolt of the clamp. A ⅜-inch second hole was drilled longitudinally in one end of the second lower bar, and that hole was tapped to accept a ⅜-inch 16 heli-coil insert. The heli-coil insert was placed in the second hole and the test clamp was screwed into the hell-coil insert. Then the two bars were placed together in abutting relationship with the holes axially aligned and the test clamp extending from the second hole in the lower bar into the first hole in the upper bar.

With the sleeve within the first hole in the upper bar, the bolt of the test clamp was torqued to 25 foot-pounds, and the two bars were placed in the gripping assembly of the tensile testing machine with proper shimming. A steady load was applied axially to pull the joint apart until the testing machine indicated that the joint had yielded. Yield occurred at a load of 1,435 pounds.

Removal of the bars from the gripping assembly and examination of the test clamp revealed that the yield had been a momentary yield or slippage in which pulled the sleeve of the test clamp moved further toward the conically shaped member of the test clamp, thereby further expanding the sleeve and seating it even more tightly into contact with the upper bar.

The bolt of the test clamp was then torqued to 40 foot-pounds, the bars were returned to the gripping assemblies, and an additional load was applied until the joint yield. That occurred at 2,920 pounds. The bolt was then torqued to 45 foot-pounds, returned to the gripping assemblies, and tested. A first momentary yield or slippage occurred at 3,300 pounds. Once the sleeve slipped, expanded, and reset, the load was again increased. A second momentary yield occurred at 4,820 pounds, at which point the sleeve again slipped, expanded, and reset.

The load was then increased until a third yield occurred at 5,800 pounds. At that point, the test clamp had insufficient surface area to expand and reset. Then, the load was increased to 6,120 pounds, at which time the test was terminated because the lower aluminum bar began to tear at the base of the hole in it.

From the foregoing, one can see that a clamp assembly constructed according to the invention develops more holding strength at higher torque settings. Higher torque settings allow the sleeve to expand more and therefore require more load to cause slippage. The four clamp assemblies 10–13 on the receiver plate 14 might require as much as 27,000 pounds per square inch or more to cause a failure. Furthermore, when the clamp assembly is put under a shear force, it is virtually indestructible. The base material would shear before the clamp assembly.

Thus, the invention provides a strong clamp assembly that locks and unlocks with a partial turn of a bolt. The clamp provides strong and quick locking and release action. It has just a few, relatively inexpensive components. It installs easily and maintains positional accuracy and repeatability despite its quick change attributes.

Although exemplary embodiments have been shown and described, one of ordinary skill in the art may make many changes, modifications, and substitutions without necessarily departing from the spirit and scope of the invention. Instead of using a bolt with a conically shaped head, for example, a second conically shaped member may be used between the head of the bolt and the sleeve. One of ordinary skill in the art may make those and various other changes in the preferred embodiments illustrated without departing from the broader inventive concepts disclosed.

What is claimed is:

1. A method of clamping a first object having a first bore extending through the first object to a second object having a threaded second bore so that the first object lies flat against the second object and the first and second bores are axially aligned, the method comprising:

provviding a clamp assembly having (i) a resiliently deformable sleeve with a slit extending from a first end of the sleeve to a second end of the sleeve and an unexpanded size adapted to fit in the first bore, (ii) a conically shaped member facing the second end of the sleeve, and (iii) a bolt having a conically shaped head facing the first end of the sleeve and a shank extending through the sleeve and through the conically shaped member, such that the head of the bolt is adapted to be engaged by a tool for purposes of rotating the bolt, the head of the bolt has a size and shaped adapted it in the first bore, and the shank of the bolt is adapted to screw into the second bore for purposes of engaging the second object;

placing the shank of the bolt through the sleeve and through the conically shaped member so that the head of the bolt faces the first end of the sleeve and the conically shaped member faces the second end of the sleeve;

screwing the shank of the bolt partially into the second bore without expanding the sleeve beyond the unexpanded size;

placing the first object onto the second object so that the first and second bores are axially aligned and the sleeve is disposed within the first bore;

engaging the head of the bolt with the tool and rotating the bolt in order to screw the shank of the bolt further into the second bore, thereby to expand the sleeve radially against the first object within the first bore while forcing the sleeve and the first object axially toward the second object.

2. A method as described in claim 1, further comprising the step of installing a bushing in a hole in the first object as part of the first object for purposes of defining the first bore.

3. A clamp assembly for clamping a first object having a first bore extending through the first object to a second object having a threaded second bore so that the first object lies flat against the second object and the first and second bores are axially aligned, the clamp assembly comprising:

a sleeve having an unexpanded size adapted to fit within the first bore in the first object, the sleeve having a first end, a second end, and a slit extending from the first end to the second end, which sleeve is composed of a resiliently deformable material; and expansion means for radially expanding the sleeve within the first bore of the first object while applying force to the sleeve axially toward the second object;

the expansion means including a first conically shaped structure having a first conically shaped surface facing the first end of the sleeve;

the expansion means including a second conically shaped structure having a second conically shaped surface facing the second end of the sleeve; and the expansion means including a bolt having a head adapted to be engaged by a tool for purposes of rotating the bolt, and a shank adapted to extend through the sleeve and through the second conically shaped structure and to screw into the second bore for purposes of engaging the second object, said bolt operating when rotated to force the first conically shaped structure toward the second object in order to force the first conically shaped surface against the first end of the sleeve and toward the second object while the second conically shaped surface bears in opposition against the second end of the sleeve;

wherein the first conically shaped structure has a size and shape adapted to fit in the first bore; and wherein the head of the bolt has a size and shape adapted to fit in the first bore;

whereby a user can remove the first object from the second object without removing the bolt from threaded engagement of the second object by engaging the head of the bolt with the tool, rotating the bolt sufficiently with the tool to allow the sleeve to contract to the unexpanded size, and then withdrawing the first object from the second object while the bolt remains in threaded engagement of the second object and the head of the bolt and the second conically shaped structure move axially out of the first bore.

4. A clamp assembly as recited in claim 3, wherein the the first conically shaped structure and the first conically shaped surface are parts of the head of the bolt.

5. A clamp assembly as recited in claim 3, further comprising means in the form of a bushing disposed within a hole in the first object for defining the first bore.

6. A clamp assembly for clamping a first object having a first bore extending through the first object to a second object having a threaded second bore so that the first object lies flat against the second object and the first and second bores are axially aligned, the clamp assembly comprising:

a sleeve composed of a resiliently deformable material, the sleeve having a first end, a second end, a slit extending from the first end to the second end, a first tapered inner surface extending axially from the first end toward the second end while decreasing in inside diameter, a second tapered inner surface extending axially from the second end toward the first end while decreasing in diameter, and a cylindrically shaped outside diameter smaller than the diameter of the first bore; and expansion means for radially expanding the sleeve within the first bore of the first object while applying force to the sleeve axially toward the second object in order to thereby cause the sleeve to bear against the first object radially as well as axially toward the second object;

the expansion means including the combination of a conically shaped member with a bore through it and a bolt having a conically shaped head adapted to be engaged by a tool for purposes of rotating the bolt, and a shank adapted to screw into the second bore in the second object for purposes of engaging the second object, said bolt operating when rotated to force the conically shaped head against the first tapered inner surface of the sleeve while the conically shaped member bears in opposition to the conically shaped head against the second tapered inner surface of the sleeve;

the conically shaped head of the bolt including a tapered exterior surface facing the first tapered interior surface of the sleeve, and the conically shaped member having a tapered exterior surface facing the second tapered inner surface of the sleeve;

the shank of the bolt extending from the conically shaped head of the bolt, axially through the sleeve, and then axially through the bore in the conically shaped member to a threaded end portion of the shank in a position beyond the conically shaped member enabling the shank to be screwed into the second bore in the second object;

wherein the head of the bolt has a size and shape adapted to fit in the first bore;

whereby screwing the shank of the bolt sufficiently into the second bore in the second object, with the sleeve disposed within the first bore in the first object, causes the tapered exterior surface of the conically shaped head of the bolt and the tapered exterior surface of the conically shaped member to cooperatively bear against respective ones of the first and second tapered inner surfaces of the sleeve and thereby cause the diameter of the sleeve to increase so that the sleeve bears against an interior surface of the first bore radially as well as axially toward the second object; and whereby a user can remove the first object from the second object without removing the bolt from threaded engagement of the second object by engaging the head of the bolt with the tool, rotating the bolt sufficiently with the tool to allow the sleeve to contract to the unexpanded size, and then withdrawing the first object from the second object while the bolt remains in threaded engagement of the second object and the head of the bolt moves axially out of the first bore.

7. A clamp assembly as recited in claim 6, further comprising means in the form of a bushing adapted to be installed in a hole in the first object as part of the first object for purposes of defining the first bore.

8. A clamp assembly as recited in claim 6, wherein the conically shaped member includes means in the form of a recessed portion for receiving the head of a screw that is screwed into the second object for purposes of holding the conically shaped member on the second object during removal of the first object from the second object.

9. A clamp assembly as recited in claim 6, wherein the conically shaped member is adapted to fit with a press fit in a counterbored portion of the second bore in the second object to thereby hold the conically shaped member on the second object during removal of the first object from the second object.

10. An improved apparatus of the type having means in the form of at least one pallet component for holding a workpiece and means in the form of a receiver component for removably holding the pallet component on a worktable in order to facilitate machining of the workpiece, the improvement comprising:

means in the form of at least one clamp assembly for removably clamping the pallet component on the receiver component;

the clamp assembly including a sleeve having unexpanded size adapted to fit within a first bore in the pallet component, the sleeve having a first end, a second end, and a slit extending from the first end to the second end, which sleeve is composed of a resiliently deformable material; and the clamp assembly including expansion means for radially expanding the sleeve within the first bore while applying force to the sleeve axially toward the receiver component;

the expansion means including a first conically shaped structure having a first conically shaped surface facing the first end of the sleeve;

the expansion means including a second conically shaped structure having a second conically shaped surface facing the second end of the sleeve; and the expansion means including a bolt having a head adapted to be engaged by a tool for purposes of rotating the bolt, and a shank adapted to extend through the sleeve and through the second conically shaped structure, and to screw into a second bore in the receiver component for purposes of engaging the receiver component, said bolt operating when rotated to force the first conically shape structure toward the receiver component in order to force the first conically shaped surface against the first end of the sleeve and toward the receiver component while the second conically shaped surface bears in opposition against the second end of the sleeve;

wherein the first conically shaped structure has a size and shape adapted to fit in the first bore; and wherein the head of the bolt has a size and shape adapted to fit in the first bore;

whereby screwing the bolt into the second bore in the receiver component, with the first and second bores axially aligned and the sleeve disposed within the first bore, causes the first conically shaped surface and the second conically shaped surface to cooperatively bear against respective ones of the first and second ends of the sleeve and thereby cause the diameter of the sleeve to increase so that the sleeve bears against an interior surface of the first bore radially as well as axially toward the receiver component; and whereby a user can remove the pallet component from the receiver component without removing the bolt from threaded engagement of the receiver component by engaging the head of the bolt with the tool, rotating the bolt sufficiently with the tool to allow the sleeve to contract to the unexpanded size, and then withdrawing the pallet component from the receiver component while the bolt remains in threaded engagement of the receiver component and the head of the bolt and the second conically shaped structure move axially out of the first bore.

* * * * *